United States Patent [19]

Outland

[11] 4,276,071
[45] Jun. 30, 1981

[54] CERAMIC FILTERS FOR DIESEL EXHAUST PARTICULATES

[75] Inventor: Robert J. Outland, Grosse Pointe Woods, Mich.

[73] Assignee: General Motors Corporation, Detroit, Mich.

[21] Appl. No.: 99,935

[22] Filed: Dec. 3, 1979

[51] Int. Cl.³ .............................................. B01D 39/20
[52] U.S. Cl. ................................ 55/523; 55/DIG. 5; 55/DIG. 30; 60/311
[58] Field of Search .......... 55/523, DIG. 5, DIG. 30; 252/477 R; 106/40 R; 60/295, 299, 300, 311; 422/180; 428/73, 116, 117, 118; 75/200; 210/510

[56] References Cited

U.S. PATENT DOCUMENTS

| | | | |
|---|---|---|---|
| 994,282 | 6/1911 | Spilsbury | 55/523 |
| 3,458,977 | 8/1969 | Young et al. | 428/116 |
| 3,853,485 | 12/1974 | Hogan | 252/477 R |
| 3,885,977 | 5/1975 | Lachman et al. | 428/116 |
| 3,899,326 | 8/1975 | Frost et al. | 75/214 |
| 3,903,341 | 9/1975 | Gerhold | 428/116 |
| 3,922,412 | 11/1975 | Yoshikawa et al. | 428/116 |
| 3,930,522 | 1/1976 | Turner | 252/477 R |
| 3,954,672 | 5/1976 | Somers et al. | 252/455 R |
| 4,041,591 | 8/1977 | Noll et al. | 428/117 |
| 4,041,592 | 8/1977 | Kelm | 428/117 |
| 4,054,417 | 10/1977 | Rosebrock | 55/DIG. 30 |

FOREIGN PATENT DOCUMENTS 2248359   5/1973   Fed. Rep. of Germany ............. 55/523

OTHER PUBLICATIONS

Drehmel, Dennis; Giliberti, David; High Temperature Fine Particle Control Using Ceramic Filters, Jun. 20-24, 1977, p. 29, FIGS. 1-6.

*Primary Examiner*—David L. Lacey
*Attorney, Agent, or Firm*—Robert J. Outland

[57] ABSTRACT

Diesel exhaust particulates are efficiently trapped by incineration cleanable ceramic monolith porous wall filter elements. A number of arrangements for high efficiency elements having high filtration area in compact units are disclosed.

4 Claims, 18 Drawing Figures

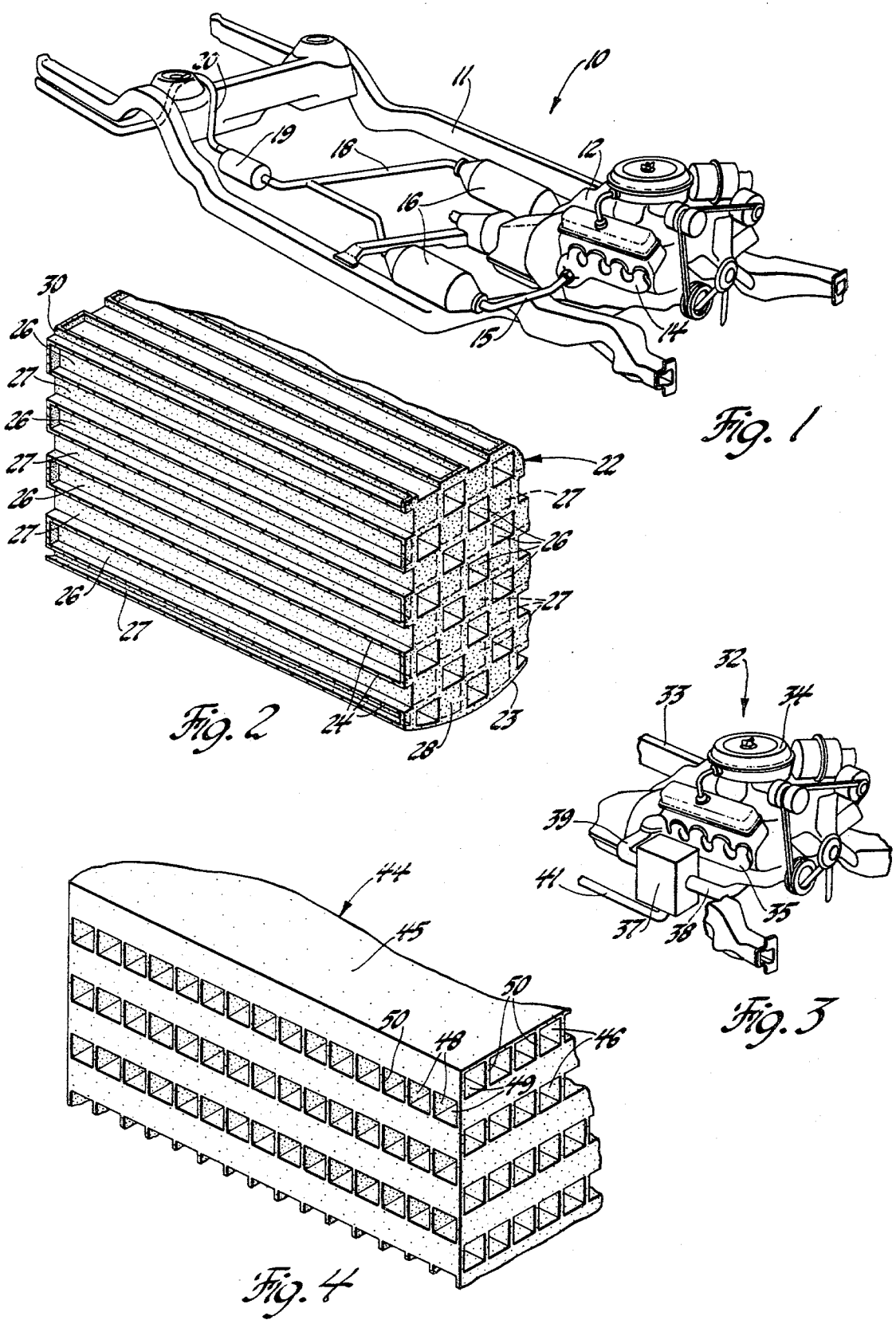

CERAMIC FILTERS FOR DIESEL EXHAUST PARTICULATES

TECHNICAL FIELD

This invention relates to exhaust particulate traps for diesel engines and the like and more particularly to exhaust filtration devices having monolithic ceramic filter elements.

Certain subject matter disclosed herein is claimed in copending U.S. patent application Ser. No. 99,933 filed contemporaneously herewith and assigned to the assignee of the present invention.

BACKGROUND OF THE INVENTION

Considerable interest has recently been focused on the problem of limiting the mass of particulate matter emitted with the exhaust gases from diesel and other internal combustion engines. In the case of diesel engines, a great deal of effort is currently being expended to develop practical and efficient devices and methods for reducing emissions of largely carbonaceous particulates in exhaust gases.

It is recognized that one method for accomplishing this is to provide suitable filters or other types of particulate traps in engine or vehicle exhaust systems. With this in mind, work is being done to find the most efficient and practical ways of collecting and disposing of the sooty particulate matter emitted from diesel engines prior to discharge of the exhaust gases to atmosphere.

SUMMARY OF THE INVENTION

The present invention proposes the use of porous wall monolithic ceramic filter elements of novel structure and configuration for the efficient trapping of diesel engine particulates. The elements are arranged to provide compact high efficiency units of extremely high filter surface area for their volume. They are capable of being cleaned by heating the monolithic structure, or portions thereof, up to the incineration temperature of the collected particulates whereby the particulates are removed by burning. Various arrangements of porous wall monolithic ceramic filter element constructions and methods of their manufacture are included in the invention.

These and other features and advantages of the invention will be more fully understood from the following description of certain preferred embodiments taken together with the accompanying drawings.

BRIEF DESCRIPTION OF THE DRAWINGS

In the drawings:

FIG. 1 is a pictorial view of a partial vehicle chassis including a diesel engine with an exhaust system equipped with a pair of exhaust particulate traps in accordance with the invention;

FIG. 2 is a sectional pictorial view showing the construction of the monolithic ceramic filter elements used in the particulate traps of the arrangement of FIG. 1;

FIG. 3 is a fragmentary pictorial view of a partial vehicle chassis mounting an alternative embodiment of diesel particulate trap in accordance with the invention;

FIG. 4 is a fragmentary pictorial view illustrating the construction of the ceramic filter element utilized in the particulate trap arrangement of FIG. 3.

BEST MODE FOR CARRYING OUT THE INVENTION

Figure 5A:
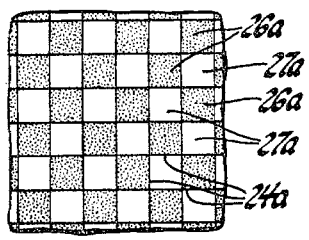
FIGS. 5a-k, m, n, and p are fragmentary schematic cross-sectional views illustrating a number of wall and passage configurations for ceramic monolithic filter elements of the general type illustrated in FIG. 2.

Referring now to the drawings in detail, numeral 10 generally indicates a vehicle chassis, portions of which have been omitted from the drawing for clarity. The chassis 10 includes a vehicle frame 11 on which is mounted a V-type diesel engine 12. Engine 12 includes a pair of cylinder banks each mounting an exhaust manifold 14 connected in an engine exhaust system, the right hand manifold being the only one visible in the figure.

Each exhaust manifold connects through a suitable exhaust pipe 15 with an exhaust particulate trap 16 suitably supported in the vehicle frame by means not shown and adapted to collect particulates in the exhaust gases delivered to the traps from the cylinders of the respective cylinder banks. The outlets of the traps 16 are connected through a wye pipe 18 with a muffler 19, which in turn connects through a tailpipe 20 with the rear of the vehicle for passing the exhaust gases to atmosphere.

Each of the particulate traps 16 includes a housing which may be of any form of construction and configuration suitable for the purpose. Within the housing, there is disposed a high efficiency incineration cleanable ceramic filter element which may have any of a number of possible configurations such as, for example, that of the element illustrated in FIG. 2 and generally indicated by numeral 22. Filter element 22 is in the form of a ceramic monolith having a surrounding cylindrical outer wall 23 internally interconnected by a large number of interlaced thin porous internal walls 24. The interlaced walls define internally thereof two groups of parallel passages including respectively inlet passages 26 and outlet passages 27, each extending to opposite ends of the element 22. The inlet passages 26 are open at the inlet end 28 of the element and are closed at the outlet end 30 of the element, while the outlet passages 27 are closed at the element inlet end 28 and open at the outlet end 30.

In the FIG. 2 embodiment, the passages are of square cross section although, as will be subsequently more fully discussed, numerous other configurations could be utilized. Further, the inlet and outlet passages are arranged in vertical and horizontal rows (as viewed in cross section) with the inlet passsages alternating with exhaust passages in a checkerboard pattern. Thus, it will be appreciated that each interior wall portion of the element lies between an inlet passage and an outlet passage at every point of its surface except where it engages another wall, as it does at the corners of the passages. So, except for the corner engagement, the inlet passages are spaced from one another by intervening outlet passages and vice versa.

The construction of the ceramic monolith is such that the interior walls 24 are porous so as to permit passage of exhaust gases through the walls from the inlet to the outlet passages. The porosity of the walls is sized appropriately to filter out a substantial portion of the particulates present in diesel exhaust gases. At present, tests have indicated that efficient filtration is provided by a ceramic wall structure having an average porosity of about 10%, a mean pore size of from about 2 to 15 microns in a range or pore sizes of from about 0.5 microns to about 70 microns. This has been accomplished in a monolith structure having square passages measuring on the average about 0.06 inches on a side with a wall thickness of about 0.015 inches between passages. Recognizing that the entire internal wall structure between inlet and outlet passages represents active filtering area, it is apparent that this structure provides more than 20 square inches of filter wall area for each cubic inch of the monolithic filter structure. Thus, a filter having very low restriction with a large amount of filter area in a very small package is provided. Increasing the average porosity of the walls above the 10% figure of the initial test samples would, of course, be expected to further reduce the restriction to gas flow through the filter element, at least to a point where the areas of the inlet and outlet passages become the limiting factors to gas flow.

In operation of an engine having one or more of the described compact high-efficiency exhaust particulate filter elements in the exhaust system, exhaust gases will be passed from the engine into the particulate trap 16 where they enter the filter element through the open ends of the inlet passages at the inlet end 28 of the element. The incoming gases are distributed throughout the lengths of the respective inlet passages from which they pass through all of the porous walls defining the respective passages into the adjacent outlet passages.

A large portion of the carbonaceous particulates in the diesel exhaust gases are trapped and collected on the interior surfaces of the inlet passage walls as the exhaust gases pass therethrough. The collected particulates form a cake on the wall surfaces which build up until it eventually reaches a thickness that begins to interfere with gas flow through the walls. The cleaned gases, passing through the walls into outlet passages, continue to their open ends at the outlet end of the element and continue through the remainder of the exhaust system to the atmosphere.

Periodically, during operation of an engine with an exhaust filter of the type described, the collected particulates will reach a level beyond which the restriction to gas flow will become excessive. At or in advance of this point, it becomes necessary to either clean or replace the filter element so that efficient operation of the engine in the vehicle may continue. While the high efficiency compact monolithic ceramic element of the present invention is capable of use in any desired manner, it is contemplated that cleaning of the element will best be accomplished through heating the element to a temperature at which the collected particulates are incinerated by reaction with oxygen in the exhaust gas stream. Such incineration can take place by heating of the exhaust gases during engine operation to the desired incineration temperature, subject of course to suitable methods of heating and control of combustion temperatures. Alternatively, monolithic ceramic filter elements may be cleaned by removing the elements from the exhaust system and placing them in the controlled environment of a furnace, where they may be heated to the incineration temperature of the particulates which are completely burned so that the filter element may again be reused.

In order to withstand the operating and incineration temperatures and stresses placed on a ceramic filter under the conditions indicated, it is necessary that the filter element be formed of a suitable ceramic material. While many such materials might be appropriate, we prefer at present to form the ceramic elements by first using materials and methods developed for forming ceramic monoliths for catalytic converters and the like which are described in U.S. Pat. No. 3,954,672 to Somers, Berg and Shukle, assigned to the assignee of the present invention. This patent describes—particularly beginning in column 6, line 17, and extending to column 7, line 48—a preferred series of steps in the manufacturing process for the formation of extruded open-ended ceramic monoliths for use in catalytic converters and other devices.

Upon completion of these manufacturing steps, the open-ended monolithic structure is converted to a filter element having alternate passages plugged, as previously described, by closing the ends of alternate passages. This is done by depositing at those ends a suitable cement material to form the desired end closing walls and subsequently hardening the cement. The cement is preferably prepared by forming a mixture consisting of 71.5% milled cordierite based filler, prepared from ceramic material of the same type forming the monolith which has been ground and passed through a 100 mesh screen, and 28.5 collodial silica (30% solids in 70% water). The cement may be applied in any manner, such as for example with a hypodermic needle-like plunger, after which it is set by heating the cemented monolith in an oven for eight to ten hours at 200–220 degrees Fahrenheit and subsequently fully hardening the cement by heating at 1,000 degrees Fahrenheit for one-half hour. The milled cordierite based filler for the cement may be obtained from grinding up the bodies of scrap monoliths. The collodial silica is available from E. I. Du Pont de Nemours and Company, Inc., Industrial Chemicals Division, Wilmington, Delaware, under the same Ludox AS Colloidal Silica (30% Solids).

Alternative Monolith Constructions

While the preceding description has set forth the best mode presently known for making and using the present invention through the description of a preferred embodiment, it should be recognized that many variations of the structure and manufacturing methods are possible within the context of the inventive concepts embodied in the invention. As an example, the structure of an alternative embodiment of ceramic diesel exhaust filter element and its application in a vehicle exhaust system, are disclosed in FIGS. 3 and 4 of the drawings.

In FIG. 3, numeral 32 generally indicates portions of a vehicle chassis having a frame 33 in which is mounted a V-type diesel engine 34. The engine has dual cylinder banks that deliver exhaust gases to a pair of exhaust manifolds 35, only the manifold for the right bank of cylinders being shown. Adjacent the right side of the engine, there is mounted an exhaust particulate trap 37 having a cubically shaped housing with front and rear inlets connected by exhaust pipes 38, 39 with the left hand and right hand exhaust manifolds respectively. An exhaust outlet on the bottom of the housing connects with an outlet pipe 41 for delivery of cleaned exhaust gases to a muffler, not shown, and subsequently to the atmosphere.

Within the housing of the particulate trap 37, there is disposed a compact exhaust particulate filter element of the form shown in FIG. 4 and generally indicated by numeral 44. The element in this instance is formed by a ceramic cross-flow monolith of a type produced by the 3M Company under the tradename Thermacomb. The construction of this type monolith involves an integral ceramic body 45 having a plurality of alternately stacked layers of longitudinal passages 46 and lateral passages 48 which are separated from one another by porous internal walls 49.

In the illustrated construction, the longitudinal passages 46 are utilized as inlet passages while the lateral passages 48 are utilized as outlet passages and are disposed vertically as installed in the particulate trap 37. It will be apparent from viewing FIG. 4 that the separator walls 49 lie between the layers of longitudinal passages 46 and lateral outlet passages 48 and thus constitute filtering walls, the surfaces of which act to collect the particulates passed from the inlet to the outlet passages through these walls. However, support walls 50 are formed within each of the layers which serve no filtering function since they merely separate inlet passages from other inlet passages or exhaust passages from other exhaust passages. Accordingly, when this form of ceramic element is used for filtration in the manner described, only about half of the internal walls are utilized as filtering surface. Thus the size of the filter element must be made approximately twice as large as that of the first described embodiment in order to provide the same filter area and equivalent freedom of flow through the porous walls.

When the element 44 is installed within the housing of the particulate trap 37, the upper ends of the then vertically extending lateral outlet passages 48 are blocked off so that flow from the passages must pass through the bottom open ends into the exhaust pipe 41. Flow into the inlet passages enters through both ends which are open coming through exhaust pipes 38 from the left cylinder bank and 39 from the right bank of cylinders. The gas is fed from both ends into the inlet passages and is filtered through the separator walls 49, passing into the exhaust passages 48 and out through their lower open ends to the exhaust pipe 41. Obviously, other arrangements for connecting the described filter element in a particular trap could be utilized if desired and, further, other arrangements of filter elements could be embodied in particulate traps, all within the scope of the inventive concepts described.

Element Passage Configurations

In addition to variations in the arrangement of passages in monolithic ceramic filter elements, as are shown for example in FIGS. 2 and 4, it is also recognized that various passage configuration may be utilized within the various general types of elements. For example, FIGS. 5a-k, m, n, and p illustrate a number of the many possible variations that could be made in configurations of passages utilized for ceramic monolith filters of the general type illustrated in FIG. 2; that is, monoliths having alternately blocked parallel passages extending from end to end within the element wherein substantially all of the wall area, except at points of engagement with other walls, involves effective filtering area.

FIG. 5a, for example, shows a schematic cross-sectional view of a portion of an element similar to that of FIG. 2 in which the walls 24a are arranged in a checkerboard square pattern. The inlet passages 26a are shaded to indicate they are blocked at their outlet ends, while the outlet passages 27a are clear to show they are open at their outlet ends. This view shows clearly the advantage of this arrangement, that all of the internal walls lie between inlet and outlet passages except at their points of contact with other walls at the edges of the square cross-section passages. Thus, nearly 100% of the wall area constitutes filter surface with this parallel passage arrangement.

Figure 5B:
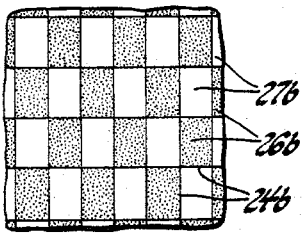
Figure 5C:
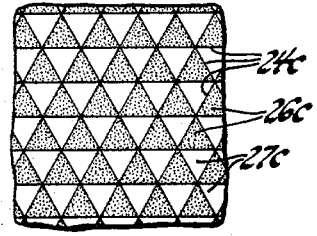
Figure 5D:
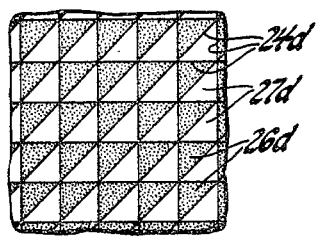
Figure 5E:
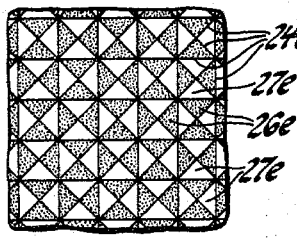
Figure 5F:
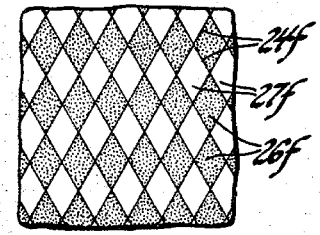

Similar results are obtained in all of the other embodiments illustrated in FIGS. 5b-k, m, n, and p; however, certain differences are apparent. FIGS. 5b through 5e are similar to FIG. 5a in that the parallel and adjacent inlet and outlet passages are of equivalent cross section and formed by intersecting planar walls. The passages in FIG. 5b are of rectangular cross section, while those of FIGS. 5c, d, and e show various triangular forms. FIG. 5f illustrates diamond-shaped passages.

Figure 5G:
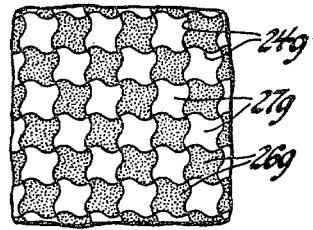

A somewhat different arrangement is illustrated in FIG. 5g, wherein the filtering area is increased by forming the walls in a wavy pattern, rather than straight or planar. This figure shows the results of providing wavy walls in an otherwise square checkerboard pattern, but it is apparent that similar results could be obtained by modifying the arrangements of FIGS. 5b through 5f by providing wavy walls in place of their planar wall arrangements.

All the arrangements so far described have the common advantage that the entire internal wall area forms effective filtering area between inlet and outlet passages wherein the inlet passages and the outlet passages are of identical cross-sectional area. It is recognized, however that, since in operation the collection of particulates forming a cake on the wall surfaces of the inlet passages will have the result of ultimately reducing the effective flow area of these passages, there may be an advantage gained by providing arrangements wherein the cross-sectional areas of the inlet passages are larger than the cross-sectional areas of the adjacent outlet passages. The arrangements to be subsequently described include this improvement while still retaining the advantage that all the internal walls extend between inlet and outlet passages except at their points of contact and thus substantially all the internal wall area provides effective filtering area.

Figure 5H:
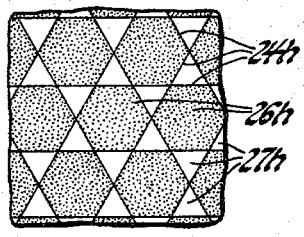
Figure 5I:
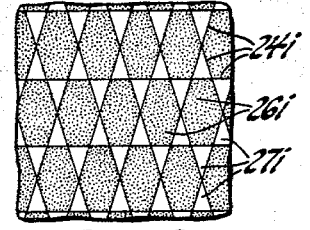
Figure 5J:
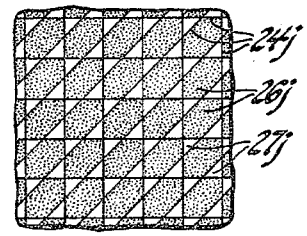
Figure 5K:
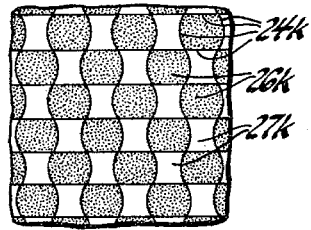

This is illustrated, first by FIGS. 5h, i, and j, wherein planar internal walls are arranged to provide differing polygonal patterns. In FIG. 5h the inlet passages 26h are defined by cross-sections in the form of equilateral hexagons which border on outlet passages 27h having cross sections that are equilateral triangles. In FIGS. 5i and 5j, the patterns are varied with differing configurations of non-equilateral hexagon section inlet passages adjacent corresponding triangular cross-section outlet passages.

Figure 5M:
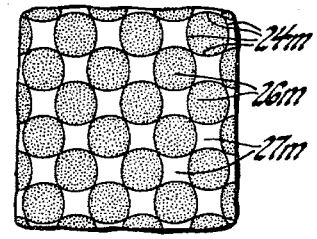
Figure 5N:
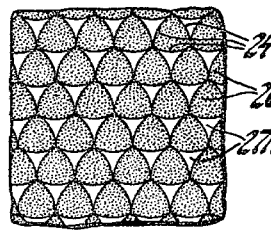
Figure 5P:
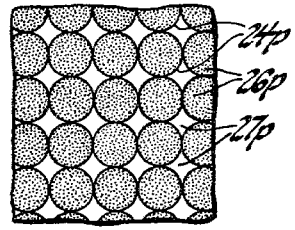

In another variation, it is recognized that non-equal area inlet and exhaust passages may be formed by varying the polygonal arrangements of FIGS. 5a through 5f by suitably curving the walls to provide what may be referred to as outwardly bulged inlet passages and inwardly bulged outlet passages. Thus, for example, in FIG. 5k, two of the four side walls of each figure are curved to provide a bulged checkerboard square pattern having the inlet passages 26k of slightly greater area than the outlet passages 27k. In FIG. 5m the effect is increased by curving all the interior walls so that all sides of the inlet passages are bulged outwardly while the corresponding sides of the outlet passages are bulged inwardly. A similar effect is seen in FIG. 5n wherein the equilateral triangular passages of FIG. 5c are bulged to provide inlet passages 26n of larger area than the outlet passages 27n. Finally, the concept is carried further in FIG. 5p wherein the inlet passages 26p are of circular cross section and the outlet passages 27p are formed by the spaces between the contacting circles. This figure is of course a variation of outwardly bulged squares, but it should be recognized that a similar effect could be obtained by arranging the circles in a triangular pattern.

Each of the arrangements shown in FIGS. 5h, i, j, k, m, n, and p and described as having larger inlet passage areas than the corresponding areas of the outlet passages still retains the advantage that substantially all the internal wall area is effective for filtration, since all of the arrangements retain the basic advantage that the walls separate inlet and outlet passages except at their points of contact. However, it should be understood that not all arrangements of polygonal or otherwise configured cross-sectional passage arrangements will have the above-mentioned advantage. For example, a pattern of hexagonal cross-sectional parallel passages may be provided which, when arranged as alternating inlet and outlet passages will have substantial portions of the non-contacting wall area separating two inlet passages or two outlet passages. This wall area would not be effective for filtration purposes. This would also be the case with numerous other patterns which might be proposed. Nevertheless, the patterns above described are intended to be representative of those having the desired advantages and are not exclusive of such patterns as fall within the scope of the inventive concepts taught herein.

While the invention has been described by reference to certain alternative embodiments chosen for purposes of illustration, it should be understood that numerous changes could be made in the structure and arrangements of the described embodiments without departing from the intended scope and concepts that form the basis of this invention. Accordingly, it is intended that the invention not be limited to the described embodiments but that it have the full scope permitted by the language of the following claims.

The embodiments of the invention in which an exclusive property or privilege is claimed are defined as follows:

1. A compact through flow exhaust particulate filter element for diesel engines, said element comprising a ceramic monolith having a plurality of interlaced thin gas filtering porous internal walls defining a plurality of parallel passages extending to opposite ends of the element, said passages including a first group comprising inlet passages open at one end of the element and closed at the other and a second group comprising outlet passages closed at said one end of the element and open at the other, wherein the said inlet and outlet passages are arranged such that each non-engaged portion of every interior wall in the element lies between an inlet passage and an outlet passage and forms a filtration surface for gas flow between them, the porosity of the walls being sized to filter out a substantial portion of particulates present in diesel exhaust gases passed through the element from the inlet to the outlet passages and the improvement wherein the inlet passages have individual and collective cross-sectional areas substantially greater than the respective individual and collective cross-sectional areas of the outlet passages to provide a significant volume for collection of particulates in the filter element inlet passages without reduction of their effective flow area below that of the outlet passages.

2. The filter element of claim 1 wherein the inlet passages are of hexagonal cross section and the outlet passages are triangular.

3. The filter element of claim 1 wherein the inlet passages are of outwardly bulged polygonal cross section and the outlet passages are inwardly bulged polygons.

4. The filter element of claim 1 wherein said inlet passages are of circular cross section and the outlet passages comprise the spaces between adjoining circular walls.

* * * * *

UNITED STATES PATENT AND TRADEMARK OFFICE
CERTIFICATE OF CORRECTION

PATENT NO. : 4,276,071
DATED : June 30, 1981
INVENTOR(S) : Robert J. Outland

It is certified that error appears in the above—identified patent and that said Letters Patent is hereby corrected as shown below:

On the Title Page, under Other Publications, "Giliberti" should read -- Ciliberti -- and "p. 29" should read -- pp. 2-9 --.

Column 4, line 32, "same" should read -- name --.

Signed and Sealed this

Twenty-seventh Day of October 1981

[SEAL]

Attest:

Attesting Officer

GERALD J. MOSSINGHOFF

Commissioner of Patents and Trademarks